United States Patent [19]

Emori et al.

[11] Patent Number: 5,332,055
[45] Date of Patent: Jul. 26, 1994

[54] POWER STEERING APPARATUS HAVING HYDRAULIC REACTION MECHANISM

[75] Inventors: Yasuyoshi Emori; Ikuo Nomura; Tetsuya Koike, all of Saitama, Japan

[73] Assignee: Jidosha Kiki Co., Ltd., Tokyo, Japan

[21] Appl. No.: 63,215

[22] Filed: May 17, 1993

[30] Foreign Application Priority Data

May 29, 1992 [JP] Japan .................. 4-161868

[51] Int. Cl.⁵ .............................. B62D 5/06
[52] U.S. Cl. ...................... 180/132; 180/142; 180/143
[58] Field of Search ........... 180/132, 141, 142, 149, 180/152, 143

[56] References Cited

U.S. PATENT DOCUMENTS

| | | | |
|---|---|---|---|
| 3,744,515 | 7/1973 | Inoue | 180/143 X |
| 4,784,235 | 11/1988 | Ijiri et al. | 180/142 |
| 4,848,500 | 7/1989 | Komine et al. | 180/143 X |
| 5,135,068 | 8/1992 | Emori et al. | 180/132 |
| 5,152,359 | 10/1992 | Emori et al. | 180/132 X |
| 5,168,949 | 12/1992 | Emori et al. | 180/132 X |

FOREIGN PATENT DOCUMENTS

| | | | |
|---|---|---|---|
| 61-105273 | 5/1986 | Japan . | |
| 61-132466 | 6/1986 | Japan . | |
| 0229765 | 9/1989 | Japan | 180/132 |

Primary Examiner—Margaret A. Focarino
Assistant Examiner—Carla Mattix
Attorney, Agent, or Firm—Blakely, Sokoloff, Taylor & Zafman

[57] ABSTRACT

A power steering apparatus includes a main hydraulic path, a reactive oil pressure supply path, and a hydraulic reaction mechanism. The main hydraulic path supplies an oil pressure from a pump to a flow path switching valve connected to a power cylinder. The reactive oil pressure supply path branches from a portion of the main hydraulic path. The hydraulic reaction mechanism introduces part of the oil pressure, caused to diverge by the reactive oil pressure supply path, into a hydraulic reaction chamber for generating a steering reaction through a hydraulic reaction control valve mechanism controlled in accordance with the traveling conditions of a vehicle. A restriction smaller in diameter than the main hydraulic path is arranged between a branch portion branching from the main hydraulic path and the hydraulic reaction control valve mechanism, midway along the reactive oil pressure supply path.

3 Claims, 4 Drawing Sheets

POWER STEERING APPARATUS HAVING HYDRAULIC REACTION MECHANISM

BACKGROUND OF THE INVENTION

The present invention relates to a steering force control device for obtaining a proper steering force by controlling a hydraulic reaction mechanism in a power steering apparatus in accordance with the various traveling conditions of a vehicle.

In a power steering apparatus for reducing the steering wheel operating force (steering force) of a vehicle, a steering force control device has been proposed, which is designed to perform steering force control in accordance with the various traveling conditions, e.g., traveling velocity and steering angle, of a vehicle by using a hydraulic reaction mechanism.

More specifically, the input and output shafts of the power steering apparatus are relatively pivoted or restricted by using a reaction plunger for selectively restricting the input and output shafts in accordance with the magnitude of a reactive oil pressure so as to perform steering force control in which the reactive oil pressure is minimized to allow a light steering operation during parking or low-velocity travel of the vehicle, and the reactive oil pressure is increased to allow the driver to perform a steering operation with a sense of rigidity during high-speed travel so as to ensure stability in straight travel.

For example, Japanese Patent Laid-Open Nos. 61-105273 and 61-132466 disclose hydraulic reaction mechanisms of this type, in which part of a reactive oil pressure is supplied to a path branching from a main hydraulic path extending from a pump as a hydraulic source to a power cylinder through a flow path switching valve, and is controlled by a spool valve as a hydraulic reaction control valve so as to be introduced into a hydraulic reaction chamber for moving a reaction plunger.

In such a conventional apparatus, the spool valve serving as the hydraulic reaction control valve is generally operated by an electric actuator such as a solenoid coil or a stepping motor which can generate a required operating force by using an output current from a controller on the basis of detection signals from a vehicle velocity sensor, a steering angle sensor, a torque sensor, and the like. With such electronic control, the hydraulic reaction mechanism is properly operated to perform steering force control in accordance with a vehicle velocity or a steering condition.

The conventional steering force control device having the above-described arrangement and using hydraulic reaction commonly uses an oil pump serving as a hydraulic source on the power steering apparatus side operated by the engine, and a reactive oil pressure is introduced from the pump to the hydraulic reaction mechanism through a reactive oil pressure supply path branching from the main hydraulic path of the power steering apparatus. In this arrangement, the power steering apparatus and the operation of the steering force control device based on the hydraulic reaction have a substantially proportional relationship. Assume that the oil pressure from the pump increases during high-speed travel or a steering operation. In this case, this oil pressure is introduced into the spool valve for hydraulic reaction control to be increased, so that the steering force is excessively increased, posing a problem in terms of the steering force characteristics of the power steering apparatus.

In the conventional steering force control device, the spool valve for hydraulic reaction control controls a reactive oil pressure in accordance with a vehicle velocity, a steering angle, and the like. Assume that the held state of the steering wheel shifts to a steered state. In this case, as an assisting oil pressure for obtaining an auxiliary steering force, produced by the power steering apparatus, increases with an increase in load on the power steering apparatus side, the reactive oil pressure also increases without a time delay. As a result, the input torque with respect to the output rapidly increases temporarily. If the subsequent input torque/output characteristics exhibit that an increase in output is large as compared with an increase in input torque in such a state, the input torque difference between these characteristic changing portions makes the driver feel discomfort.

Such changes in characteristics will be described below with reference to FIG. 3. When a held state indicated by "O" in FIG. 3 shifts to a steered state, the input torque rapidly changes as indicated by a portion O–A in FIG. 3. Thereafter, as indicated by a portion A–P in FIG. 3, the increase in output greatly changes with the increase in input torque. The input torque difference between these characteristic changing portions (O–A, A–P) makes the driver feel discomfort.

In such a shift from a held state to a steered state, input torque/output characteristics which the driver feels natural should be smooth characteristics, as indicated by a curve O–B–P in FIG. 3. However, it is difficult for the conventional apparatus to obtain such characteristics.

Especially in the conventional apparatus, such a problem cannot be avoided because the power steering apparatus and the steering force control device based on hydraulic reaction share the hydraulic source, and the reactive oil pressure varies depending on variations in oil pressure in the main hydraulic path on the power steering apparatus side. Therefore, a demand has arisen for measures to eliminate such inconvenience.

SUMMARY OF THE INVENTION

It is, therefore, a principal object of the present invention to provide a power steering apparatus having a hydraulic reaction mechanism which allows a driver to perform a steering operation without discomfort.

In the present invention, a steering force control device based on hydraulic reaction, which shares a hydraulic source with a power steering apparatus, is designed to prevent the reactive oil pressure from increasing without a delay as the oil pressure in a main hydraulic path increases with an increase in load on the power steering apparatus side.

In order to achieve the above object, according to the present invention, there is provided a power steering apparatus comprising a main hydraulic path for supplying an oil pressure from a pump to a flow path switching valve connected to a power cylinder, a reactive oil pressure supply path branching from a portion of the main hydraulic path, and a hydraulic reaction mechanism for introducing part of the oil pressure, caused to diverge by the reactive oil pressure supply path, into a hydraulic reaction chamber for generating a steering reaction through a hydraulic reaction control valve mechanism controlled in accordance with a traveling condition of a vehicle, wherein a restriction smaller in diameter than the main hydraulic path is arranged between a branch portion branching from the main hydraulic path and the hydraulic reaction control valve mechanism, midway along the reactive oil pressure supply path.

DESCRIPTION OF THE PREFERRED EMBODIMENT

Figure 1:
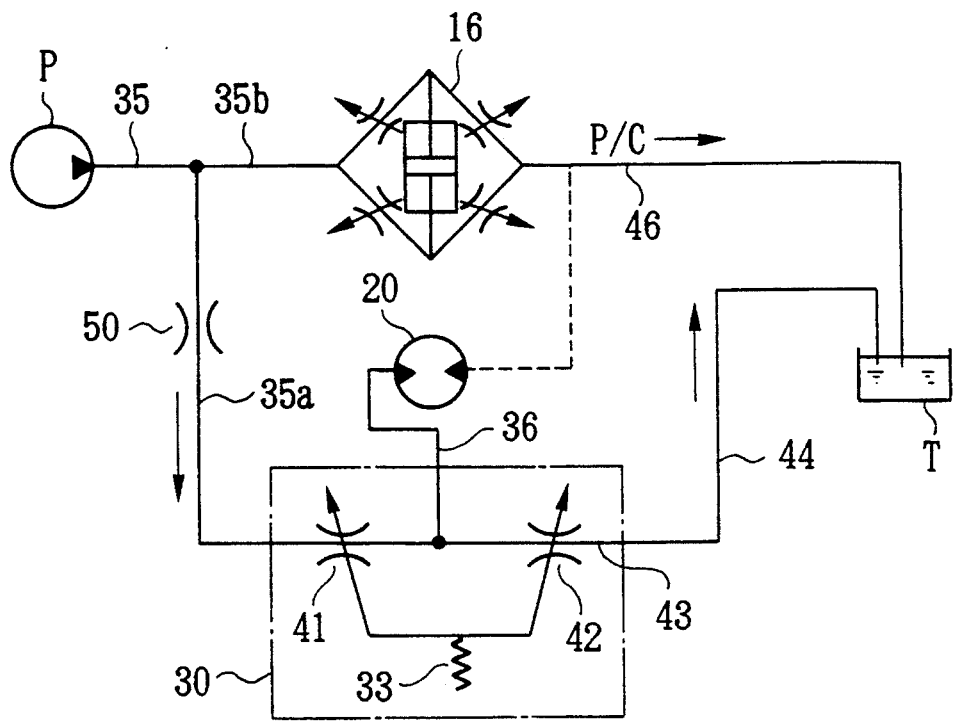
FIG. 1 is a circuit diagram showing a power steering apparatus having a hydraulic reaction mechanism according to an embodiment of the present invention.

FIGS. 1 to 5 show a power steering apparatus having a hydraulic reaction mechanism according to an embodiment of the present invention. The arrangements of a power steering apparatus main body 10 and a steering force control device 11 in the power steering apparatus will be briefly described below with reference to mainly FIGS. 4 and 5.

Reference numeral 12 denotes an input shaft (stub shaft) coupled to a steering wheel (not shown); and 13, an output shaft (pinion shaft) coupled to the left end of the input shaft 12 through a torsion bar 14 and having a pinion meshed with a rack 15 constituting a steering link mechanism (not shown). These two shafts 12 and 13 are properly rotated in a steering direction. A fail-safe mechanism is arranged between the shafts 12 and 13. As is known, the fail-safe mechanism is pivoted through a predetermined angle or more to come into contact with the shafts 12 and 13 so as to couple them together.

A rotor 17 and a sleeve 18 constituting a rotary flow path switching valve 16 are integrally formed on the two shafts 12 and 13, respectively, in a housing H constituting the power steering apparatus main body 10. The rotor 17 and the sleeve 18 are relatively rotated/displaced to perform flow path switching between an oil pump P, an oil tank T, and the left and right cylinder chambers (C1 and C2) of a power cylinder P/C. The arrangement and operation of the rotary flow path switching valve 16 are known, and hence a detailed description thereof will be omitted.

Reference numeral 20 denotes a hydraulic reaction mechanism constituting part of the steering force control device 11 and arranged between the input shaft 12 and the output shaft 13 integrally formed with the rotor 17 and the sleeve 18, respectively.

In this case, the hydraulic reaction mechanism 20 comprises a plurality of guide holes 21, a plurality of balls 22, a reaction receiving portion 24, a hydraulic reaction chamber 25, and a ring-like reaction piston 26. The guide holes 21 extend through a flange portion on the output shaft 13 in the axial direction. The balls 22 are held in the guide holes 21 to be slidable only in the axial direction. The reaction receiving portion 24 has engaging recess portions 23 equal in number to the balls 22. Each engaging recess portion 23, with which a corresponding one of the balls 22 is engaged, has inclined surfaces on both sides in the rotational direction. The reaction receiving portion 24 is arranged on the input shaft 12 to oppose one side surface of the flange portion. The hydraulic reaction chamber 25 is formed on the other side surface of the flange portion. The reaction piston 26 is slidably held in the hydraulic reaction chamber 25 to be coaxial with the input and output shafts 12 and 13. The reaction piston 26 urges the balls 22 into the engaging recess portions 23 of the reaction receiving portion 24 to cause a restricting force corresponding to a reactive oil pressure to act between the input and output shafts 12 and 13.

The reaction piston 26 has an O-ring and a seal ring constituted by a resin ring on its inner and outer peripheral portions, and is disposed in an annular space between the housing H and the output shaft 13 to be slidable in the axial direction. Reference numeral 27 denotes a ring-like partition member fitted on the output shaft 13 with a slight oil-tight clearance to partition the hydraulic reaction chamber 25 while the other end of the hydraulic reaction chamber 25 is sealed. The partition member 27 is fitted on the output shaft 13 while a seal ring similar to the above-mentioned seal ring is fitted on the outer peripheral portion of the partition member 27, thus preventing oil leakage from the hydraulic reaction chamber 25.

With this arrangement, a reactive oil pressure is properly supplied into the hydraulic reaction chamber 25 in accordance with various traveling conditions, e.g., vehicle velocity, of the vehicle so as to move the reaction piston 26 to the right in the axial direction. The balls 22 held in the guide holes 21 on the output shaft 13 side are then urged by the right end portion of the reaction piston 26, thereby urging the balls 22 in the axial direction to engage them with the engaging recess portions 23 of the reaction receiving portion 24 on the input shaft 12 side. As a result, a required restricting force based on the hydraulic reaction is obtained to properly restrict a relative rotating state between the input and output shafts 12 and 13 so as to obtain a required steering force, thereby performing proper steering force control.

That is, when the input shaft 12 is rotated in a steering operation, each ball 22 rolls upward on one of the inclined surfaces of a corresponding one of the engaging recess portions 23 and moves in the axial direction by a distance corresponding to the inclination amount of the inclined surface. A reaction which is generated by urging the reaction piston 26 at this time is transmitted, as a steering force, to the input shaft 12. The hydraulic reaction mechanism 20 is not limited to the structure in the embodiment, and a known hydraulic reaction mechanism may be used.

A hydraulic reaction control valve mechanism 30 constituting the above-described steering force control device 11 of the hydraulic reaction scheme has the following arrangement.

The hydraulic reaction control valve mechanism 30 comprises a spool valve and an electromagnetic solenoid 33. The spool valve comprises a sleeve 31 and a spool 32. The sleeve 31 is fitted in a hole portion 30a in the housing H. The spool 32 is slidably disposed in the axial hole of the sleeve 31. The electromagnetic solenoid 33 is coupled to the spool 32 to serve as an electric actuator for moving the spool 32 forward/backward. An energization current to the solenoid 33 is controlled by a controller to which detection signals from a vehicle velocity sensor, an steering angle sensor, and the like (none of which are shown) are input, thereby controlling the position of the spool 32 in the axial direction.

A distribution path 34 constituted by an annular path groove and a land portion located on its left side is formed on the outer peripheral portion of the spool 32, and the surfaces on both sides of the land portion are tapered. A reactive oil pressure supply path 35a branches from a supply path 35 as a main hydraulic path communicating with the outlet port of the pump P to supply an oil pressure to the rotary flow path switching valve 16 constituting the power steering apparatus main body 10 of the power steering apparatus. The reactive oil pressure supply path 35a has an opening on the slide surface between the sleeve 31 and the spool 32 and communicates with the left side of the distribution path 34 through the opening.

A reaction path 36 communicating with the hydraulic reaction chamber 25 has an opening on the slide surface on the left side of the reactive oil pressure supply path 35a and communicates with the right side of the distribution path 34 through the opening, thereby forming a first variable restriction 41 in the hydraulic reaction control valve mechanism 30 in FIG. 1.

An annular groove 38 constituting part of a discharge path 37 is formed in the spool 32 on the left side of the distribution path 34. The reaction path 36 communicates with the annular groove 38 through the left portion of the land portion of the distribution path 34, thereby forming a second variable restriction 42 (see FIG. 1) in the hydraulic reaction control valve mechanism 30.

More specifically, the variable restrictions 41 and 42 are respectively constituted by selective combinations of portions obtained by, e.g., chamfering the edge of the land portion between the path grooves on the spool 32 side, and the path grooves on the sleeve 31 side. A detailed arrangement of each variable restriction is known, and hence description and illustration thereof will be omitted.

Figure 4:
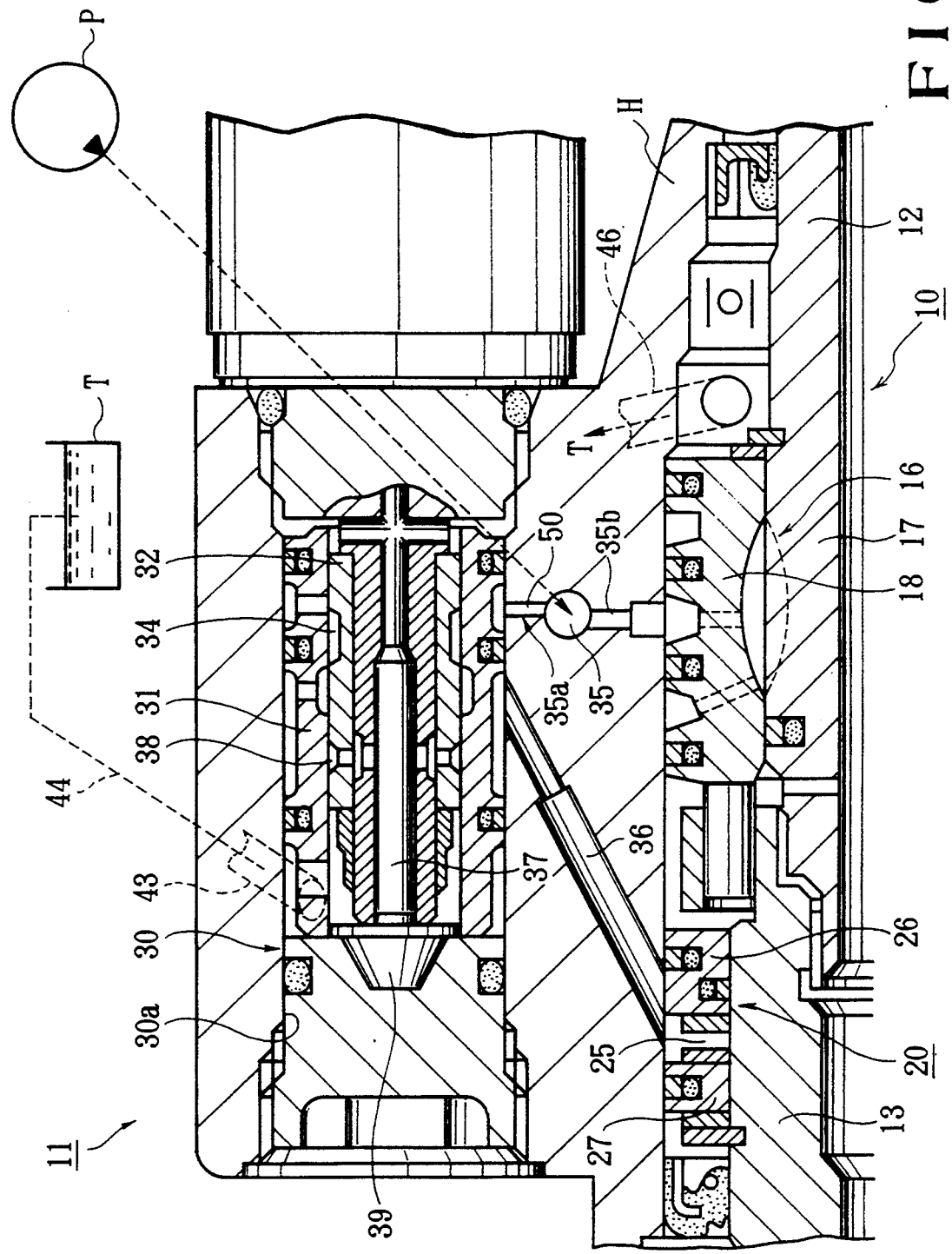
FIG. 4 is an enlarged sectional view showing a main part of the power steering apparatus having a hydraulic reaction mechanism to which the present invention is applied.
Figure 5:
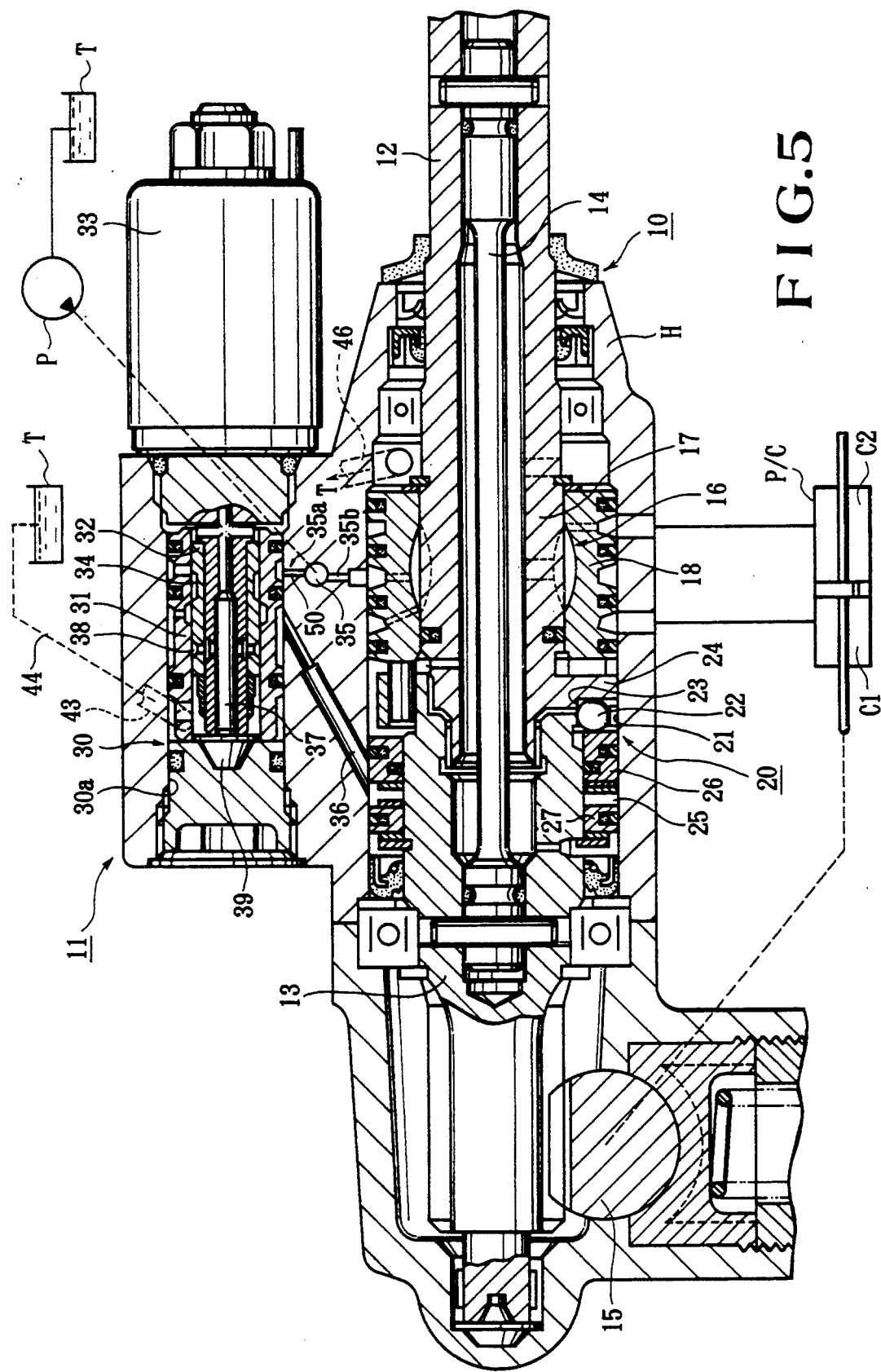
FIG. 5 is a schematic sectional view showing the overall arrangement of the power steering apparatus having a steering force control device to which the present invention is applied.

As is apparent from FIGS. 1, 4, and 5, the discharge path 37 communicates with a low-pressure chamber 39 at the left end portion of the spool 32 through an internal path formed therein, and is further connected to the tank T side through low-pressure side circulatory paths 43 and 44 formed in the housing H. Note that a low-pressure chamber is also formed at the right end portion of the spool 32. This low-pressure chamber also communicates with the above-mentioned tank T through the internal path and the like of the spool 32.

Referring to FIG. 5, reference numeral 46 denotes a hydraulic circulatory path extending from the flow path switching valve 16 of the power steering apparatus main body 10 of the power steering apparatus. As shown in FIGS. 1, 4, and 5, the path 46 is connected to the tank T through a circulatory path (not shown) in the housing H.

In the steering force control device 11 of the hydraulic reaction scheme having such an arrangement, while the solenoid 33 is in an OFF state, e.g., the engine is stopped, the spool 32 is located at the left end position by a spring (not shown) in the electromagnetic solenoid 33. In this state, the area of the flow path extending from the reactive oil pressure supply path 35a to the reaction path 36 (the first variable restriction 41) is maximized, whereas the area of the flow path between the reaction path 36 and the discharge path 37 (second variable restriction 42) is minimized.

During parking of the vehicle with the engine being stated or low-speed travel, the spool 32 is greatly moved to the right end position by the solenoid 33. At this time, the area of the supply-side flow path to the hydraulic reaction chamber 25 is minimized, whereas the area of the discharge-side flow path is maximized. As a result, the pressure in the hydraulic reaction chamber 25 becomes almost zero, and the steering reaction from the hydraulic reaction mechanism 20 becomes minimized, thereby allowing a light steering operation.

As the vehicle velocity increases, the solenoid 33 is gradually moved to the left by the spool 32. The area of the supply-side flow path to the hydraulic reaction chamber 25 increases and the area of the discharge-side flow path decreases in accordance with the moving amount of the solenoid 33. Therefore, during high-speed travel, the steering reaction to the steering wheel side increases to allow a stable steering operation with a sense of rigidity.

According to the present invention, in the steering force control device 11 of the hydraulic reaction scheme, a restriction 50 having a diameter smaller than that of the main hydraulic path (the supply path 35 and a path 35b extending from the supply path 35 to the flow path switching valve 16) is arranged between the branch portion branching from the supply path 35 as the main hydraulic path and the hydraulic reaction control valve mechanism 30, midway along the reactive oil pressure supply paths 35a and 36 which branch from portions of the supply path 35 constituting the main hydraulic path extending from the pump P to the power cylinder P/C through the rotary flow path switching valve 16, and introduce part of an oil pressure to the hydraulic reaction chamber 25 through the hydraulic reaction control valve mechanism 30 controlled in accordance with the traveling conditions of the vehicle.

In the embodiment, the reactive oil pressure path 35a branching from the supply path 35 open to the hole portion 30a, of the housing H, in which the spool valve constituting the hydraulic reaction control valve mechanism 30 is fitted, is formed as a small-diameter path as a whole.

According to such an arrangement, in the power steering apparatus of the hydraulic reaction scheme, even if the oil pressure in the main hydraulic path (the supply paths 35 and 35b, and the like) increases with an increase in load on the power steering apparatus side (the power steering apparatus main body 10, the power cylinder P/C, and the like), an increase in reactive oil pressure in the reactive oil pressure supply path system occurs with a slight time delay due to the presence of the small-diameter restriction 50 in the reactive oil pressure supply path system (the paths 35a and 36). With this operation, the reactive oil pressure can be controlled depending on the steering speed so that even a quick, transient steering operation can be smoothly performed without discomfort.

According to the structure obtained by disposing the small-diameter restriction 50 on the upstream side of the hydraulic reaction control valve mechanism 30 midway along the above-mentioned reactive oil pressure supply paths 35a and 36, an increase in downstream pressure P2 is restricted with respect to an increase in oil pressure P1 on the upstream side of the restriction 50, i.e., in the supply path 35 as the main hydraulic path on the power steering apparatus side. As a result, an increase in reactive oil pressure P3 determined by the hydraulic reaction control valve mechanism 30 can be restricted.

Especially when the pressure P1 on the main hydraulic path (35, 35b) side increases rapidly in a short period of time (TN in FIG. 2), a better control effect can be obtained with the performance of the small-diameter of the restriction 50. In a normal pressure increase period (over a period of time longer than Ts in FIG. 2), during which the pressure P1 on the power steering apparatus does not increase rapidly, the reactive oil pressure P3 can be caused to substantially follow an increase in pressure P1 by properly setting the diameter of the restriction 50. In this case, no practical problems are posed as long as a normal steering operation is performed after the interval Ts.

Figure 2:
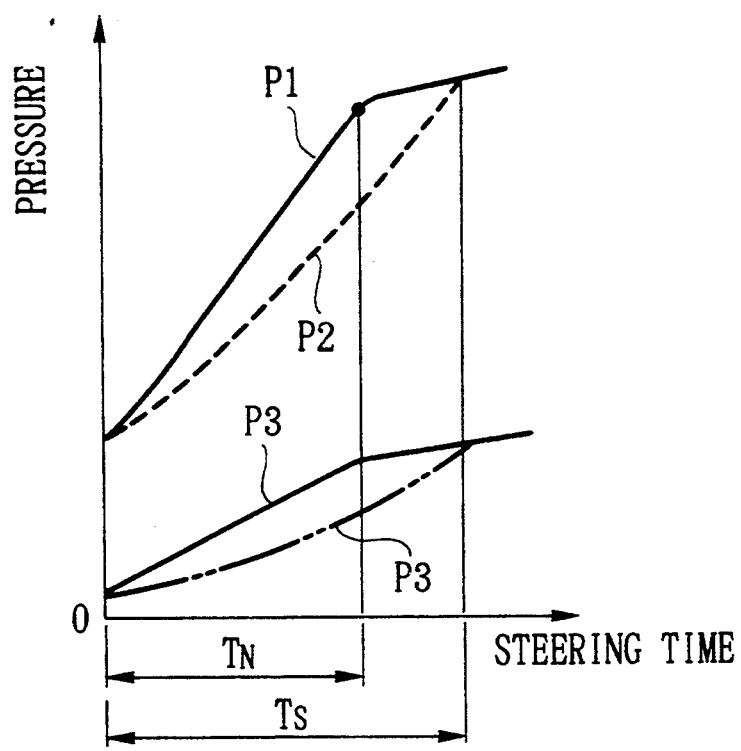
FIG. 2 is a graph showing changes in pressure as a function of steering time.
Figure 3:
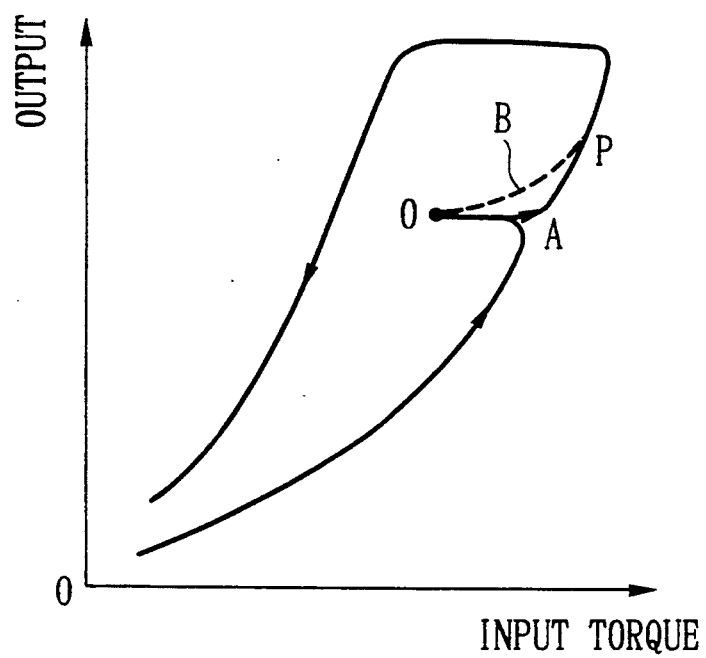
FIG. 3 is a graph showing changes in pressure as a function of input torque.

FIG. 2 shows changes in pressure as a function of steering time. Referring to FIG. 2, a solid curve P1 indicates changes in pressure in the main hydraulic path; a broken curve P2, changes in pressure in the reactive oil pressure supply path system with the restriction 50; a solid line P3, changes in pressure in reactive oil pressure in the conventional structure without the restriction 50; and an alternate long and two short dashed curve P3, changes in reactive oil pressure in the structure with the restriction 50.

Referring to FIG. 2, in the absence of the restriction 50, the changes in pressure in the reactive oil pressure supply path system exhibit almost the same characteristics as those exhibited by the changes P1 in pressure in the main hydraulic path (indicated by the solid curve P1), that is, the reactive oil pressure change characteristics indicated by the solid curve P3 are obtained. In the presence of the restriction 50, in the reactive oil pressure supply path system, as indicated by the broken curve P2, a characteristic curve indicating that an increase in pressure is delayed as compared with the characteristic curve P1 can be obtained, thus obtaining a characteristic curve indicating that the reactive oil pressure gradually increases, as indicated by the alternate long and two short dashed curve P3.

According to such hydraulic reaction control, therefore, when a held state (indicated by "O" in FIG. 3), in which the state of the steering wheel is fixed temporarily during a steering operation, shifts to a steered state, displacement of the rotary flow path switching valve 16 is started as the input torque exceeds the friction of the input shaft (steering wheel shaft) to increase the oil pressure on the power steering apparatus side. However, the reactive oil pressure does not easily increase, so that the output is mainly influenced by the oil pressure during an initial period of steering operation. In this case, only a small input torque is required, and the input torque is gradually increased. For this reason, in the input torque/output characteristic graph in FIG. 3, a characteristic curve O–B–P can be easily obtained.

Especially in such a transient phenomenon, the more graduate the change in state is, the less the driver feels discomfort.

It is apparent that the present invention is not limited to the structure of the embodiment described above, and the shape, structure, and the like of each component can be arbitrarily modified and changed.

In the above-described embodiment, the direct-driven type solenoid 33 is used as a driving source for the spool 32 in the hydraulic reaction control valve mechanism 30 constituting the steering force control device 11. However, the present invention is not limited to this. For example, a rotary driving source such as a stepping motor may be used. That is, any type of driving source can be used as long as it can drive the spool 32 in the axial direction to perform pressure control In addition, the present invention is not limited to the spool valve for hydraulic reaction control in the steering force control device 11 in the embodiment described above. The present invention can be effectively applied to any power steering apparatus having a hydraulic reaction mechanism for controlling a fluid pressure in various devices and apparatuses associated with fluids.

As has been described above, according to the power steering apparatus having the hydraulic reaction mechanism of the present invention, the restriction smaller in diameter than the main hydraulic path is arranged between the branch portion branching from the main hydraulic path and the hydraulic reaction control valve, midway along the reactive oil pressure supply path which branches from the main hydraulic path extending from the pump to the power cylinder through the flow path switching valve and introduces part of an oil pressure into the hydraulic reaction chamber through the hydraulic reaction control valve controlled in accordance with the traveling conditions of the vehicle. With this arrangement, the following excellent effect can be obtained.

Even if the oil pressure in the main hydraulic path increases with an increase in load on the power steering apparatus side, an increase in reactive oil pressure in the reactive oil pressure supply path system can be slightly delayed with the simple structure in which the small-diameter restriction is inserted in the reactive oil pressure path system branching from the main hydraulic path.

The reactive oil pressure, therefore, can be controlled depending on the steering speed so that even a quick, transient steering operation can be smoothly performed without discomfort.

What is claimed is:
1. A power steering apparatus comprising:
 a main hydraulic path for supplying an oil pressure from a pump to a flow path switching valve connected to a power cylinder;
 a reactive oil pressure supply path branching from a portion of said main hydraulic path; and
 a hydraulic reaction mechanism for introducing part of the oil pressure, caused to diverge by said reactive oil pressure supply path, into a hydraulic reaction chamber for generating a steering reaction through a hydraulic reaction control valve mechanism comprising at least a first restrictor and a second restrictor and in which a path for a reaction force is provided from the portion between the path linking the first restrictor and the second restrictor to the hydraulic reaction chamber, the hydraulic reaction control valve mechanism being controlled in accordance with a traveling condition of a vehicle,
 wherein a restriction smaller in diameter than said main hydraulic path is arranged between a branch portion branching from said main hydraulic path and said hydraulic reaction control valve mechanism, midway along said reactive oil pressure supply path.
2. An apparatus according to claim 1, wherein said hydraulic reaction control valve mechanism is constituted by a hole portion in a housing and a spool fitted in the hole portion, and
 said restriction is formed in a portion of a path hole for connecting the hole portion to said main hydraulic path.
3. An apparatus according to claim 2, wherein a restriction diameter of said restriction is set on the basis of a pressure increase condition on a main hydraulic path side in said power steering apparatus.

* * * * *